Dec. 29, 1970 J. FAXAS 3,550,361
CANE HARVESTER

Filed May 16, 1969 3 Sheets-Sheet 3

INVENTOR
JUAN FAXAS

BY
Sidney W. Russell
ATTORNEY

United States Patent Office 3,550,361
Patented Dec. 29, 1970

3,550,361
CANE HARVESTER
Juan Faxas, Central Aguirre, Puerto Rico
Filed May 16, 1969, Ser. No. 825,204
Int. Cl. A01d 45/10
U.S. Cl. 56—16                                    9 Claims

ABSTRACT OF THE DISCLOSURE

Apparatus for harvesting sugar cane or similar plants which comprises an array of shaft-mounted rotating blades and a rotating slotted drum operatively connecting with and encompassing the blades, the axis of rotation of the drum being parallel with and eccentric to the axis of revolution of the blades. Each of the blades advances out of its respective slot in the drum wall and withdraws back into the drum during a full revolution of the drum. The drum-blade system is suitably mounted on a support member which may be pushed or towed by a tractor. The drum may be vertically oriented but preferably is forwardly inclined with respect to the direction of travel.

BACKGROUND OF INVENTION
AND PRIOR ART

This invention relates to apparatus for harvesting and/or heading sugar cane, sorghum and similar grasses. More particularly, the invention concerns a machine which is capable of cutting the cane into one or more pieces and throwing the resulting pieces a substantially distance to one side or the other of the cane row being harvested.

In most of the major sugar producing areas of the world, sugar cane even today is still being harvested chiefly by hand. According to this traditional method, the worker, equipped with a machete, will cut the cane off close to the ground, strip off the leaves and then "head" or cut off the top of the stalk at its last matured joint. The worker slowly makes his way along the row, piling the cut stalk into windrows which are later gathered up and taken by cart or railway to the sugar factory. It will be apparent that such procedure is extremely slow and tedious. In view of the fact that sugar cane yields can average 20–45 tons per acre, large armies of workers are required to complete a harvest on schedule.

Mechanized harvesting has come into use only in a relatively few sugar producing regions, notably Hawaii and Louisiana. Cane harvesting machines of the prior art generally utilize an array of vertically spaced, horizontally rotating circular knifes which, as the machine is propelled down the cane row, cut the stalks into a number of pieces. Because of the limited frictional engagement of the circular blade with the stalk, these machines are incapable of throwing the cut stalk any substantial lateral distance; usually it is just enough to fall clear of the line of travel of the machine. And, since the leaves and stalks are cut all at one time, the leaves and pieces of cane are substantially intermixed as they are deposited in a pile alongside the line of travel. Also, the machine-deposited pile or windrow is poorly formed so that many of the cane pieces become encrusted with dirt or mud. Therefore, it remains necessary to employ workers to manually segregate the pieces of cane from the leaves and dirt and to load the cane onto a cart, truck or other ground transport facility. Because such conventional machines eliminate only the manual cutting operation, they are economically non-competitive with human labor in low wage areas of the world.

SUMMARY OF THE INVENTION

It is a primary object of the present invention to provide an improved harvesting machine, especially adapted for harvesting sugar cane, sorghum and similar plants, which has substantially greater efficiency than harvesters of conventional design.

Another main object of my invention is the elimination of the heretofore separate, manually carried out steps of deleafing and loading sugar cane.

Another principal objective of my invention is to provide an enhanced yield of cane which, as freshly harvested, is relatively free of leaves, straw and dirt and is clean enough to be processed at the sugar mill without further cleaning.

A still further object of this invention is the provision of means to cut sugar cane into a number of relatively short pieces including the making of a lowermost cut close to the ground.

Yet another object of this invention is to provide harvesting apparatus which not only cuts the cane into one or more pieces but at the same time imparts a substantial lateral velocity to the resulting cut stalks, whereby such pieces may be impelled a considerable distance to one side or the other of the line of travel and thence directly into the bed of an adjacent truck, or other traveling receptacle, which accompanies the harvesting machine along a parallel path of travel.

A more specific objective of the invention resides in a design such that said lateral velocity of the cane pieces has both horizontal and vertical velocity components, whereby such pieces will follow a parabolic trajectory and thus will be impelled a greater distance as well as remaining in the air for a longer period of time.

A corollary but important object of my improved apparatus is to effect a significant degree of automatic defoliation by reason of the fact that, the leaves or straw and the stalk being cut at the same time and the leaves being less dense and experiencing more friction with the air does the stalk, the leaves or straw will not fly as far as the cane stalks and will instead fall to the ground short of the truck bed.

These and numerous other objects and advantages of my invention will become apparent to those skilled in the art in light of the detailed description to follow.

Broadly stated, the can harvesting apparatus of my invention comprises an array of shaft mounted rotating blade members and a rotating slotted drum member which encompasses the blade members. The axis of rotation of the drum is parallel with and eccentric to the axis of revolution of the blade members. The system further includes means to effect the synchronous rotation of the drum and the blades, whereby each of the blades advances out of its respective slot in the drum wall and withdraws back into the drum during one full revolution thereof.

A more specific embodiment of my invention is directed to apparatus including (1) a support member adapted to be operatively coupled with a tractor or similar ground vehicle whereby said support member can be moved horizontally over the ground; (2) a rotary drum member rotatably mounted on and carried by said support member, the axis of rotation of said drum member making a predetermined angle with the vertical which ranges from 0° to substantially inclined with respect to the vertical and, when inclined, said axis of rotation extending upwardly and forwardly with respect to the direction of horizontal movement of said support member; and said drum member being provided with at least one circumferential slot in the drum wall at a locus intermediate the top and bottom of the drum; (3) a shaft member positioned within said drum member and extending parallel to said axis of rotation but forwardly offset therefrom whereby the drum member will rotate eccentrically with respect to the shaft member; (4) means connecting said shaft member with said support member; (5) at least one radial arm member connecting at its inner end portion with said shaft member at a locus opposite said circumferential slot, and said arm member thence extending radially outwardly from said shaft member toward said slot, said arm member projecting through said slot and beyond the drum wall when the slot is perigeal relative to said shaft member; (6) a torque-imparting bearing member carried by said drum member which slideably engages said arm member at an oscillating locus with respect to said shaft member, the inner and outer limits of said oscillating locus being spaced outwardly from said shaft member, whereby said arm member is free to rotate in a plane of revolution which is perpendicular to the axis of rotation of said drum member, and whereby a rotary driving force applied to said drum will effect a synchronous rotation of said arm member and vice versa; (7) a sickle-like blade attached to the outer end portion of said radial arm member, the inner edge of said blade defining a cane cutting edge which is spaced outwardly a predetermined distance beyond the exterior surface of the drum, sufficient to engage and grip the stalk of the cane between the cutting edge and drum surface, when said slot is perigeal as defined in (5); and the length of said arm member and the degree of eccentrcity as defined in (3) being correlated such that said cutting edge is withdrawn into tangential alignment with the exterior edges of said circumferential slot when the angular displacement of the slot is advanced from about 20° to 90° beyond perigeal; and the length and thickness of said blade being proportioned so that the blade will freely pass into and out of said slot as the latter is rotated toward and through its apogeal position relative to said shaft member; and (8) rotary drive means operatively connecting with one of said drum and shaft members.

In a broad aspect of the invention, there may be only a single rotating-reciprocating blade; in such instance, it will be necessary to provide suitable opposing counterweight means in order to dynamically balance the rotating arm member as well as the drum member. However, a distinctly preferred embodiment comprises at least two opposing blades spaced 180° apart relative to their plane of revolution, said blades either lying substantially in a common plane or in parallel planes of revolution which are axially spaced but closely aadjacent, each of the blades having its own circumferential slot, radial arm member and torque-imparting bearing member; the latter design achieves inherent counterbalancing, mimimizes the bending moment applied to the shaft member, and doubles the number of cuts per revolution. Additionally, the machine may utilize a ganged blade construction wherein two or more such pairs of rotating-reciprocating blades are axially spaced along the shaft member and in mutual vertical alignment, whereby each cane stalk may be cut into three or more pieces. A further refinement of the invention contemplates the use of multiple gangs of blades which are spaced axially and circumferentially, a design which increases both the number of cuts per revolution and the number of cuts per cane stalk. These and other variations of the inventive concept herein will become evident to those skilled in the art from the detailed discussion of the invention hereinbelow set forth.

DESCRIPTION OF THE DRAWINGS

The structure and mode of operation of the harvesting machine may be more clearly understood by reference to the accompaying drawings, which illustrate a preferred embodiment of the invention, and in which.

DETAILED DESCRIPTION OF THE INVENTION

Figure 1:
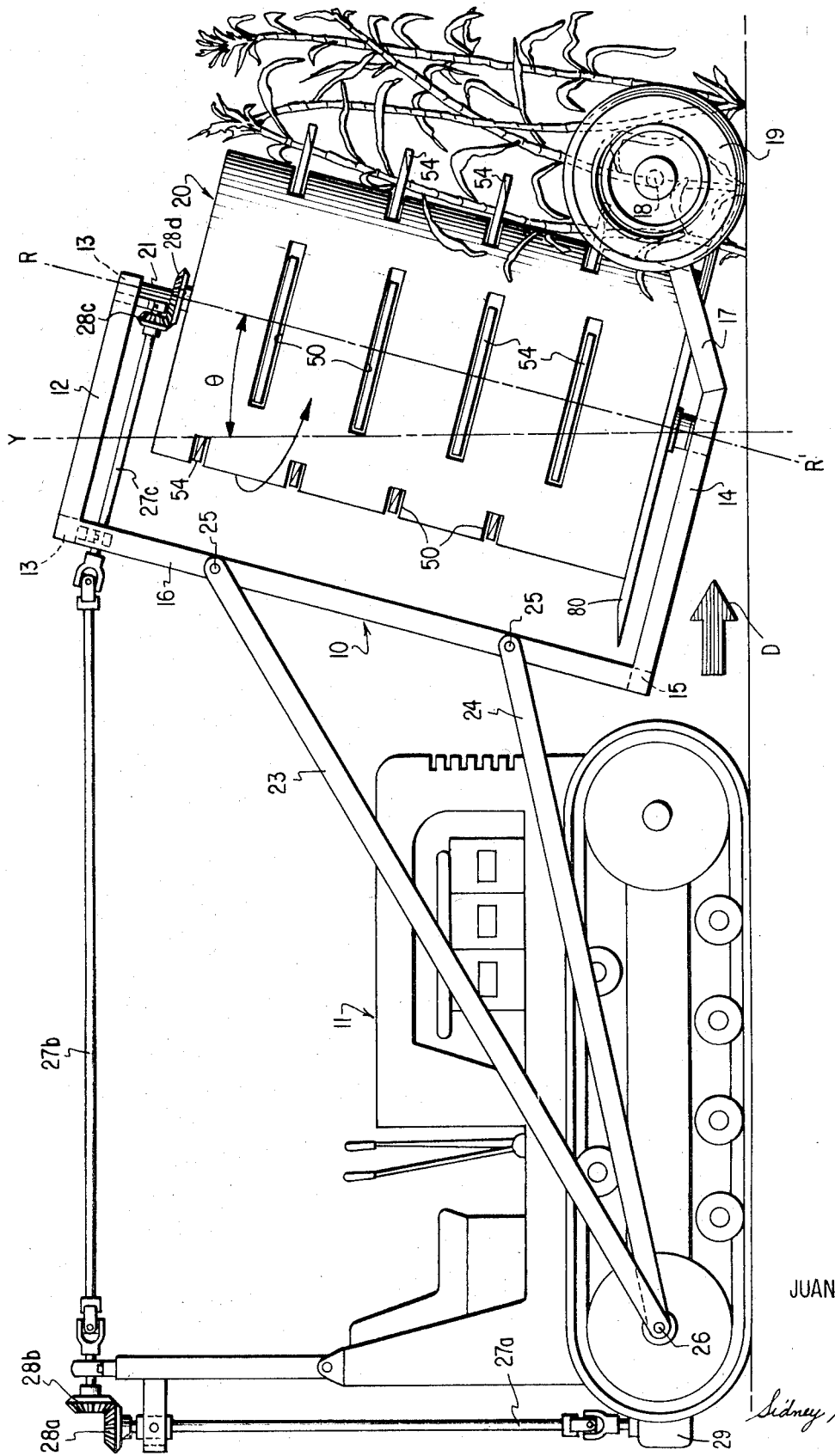
FIG. 1 is an elevation view of the overall harvesting apparatus operating in combination with a tractor.
Figure 2:
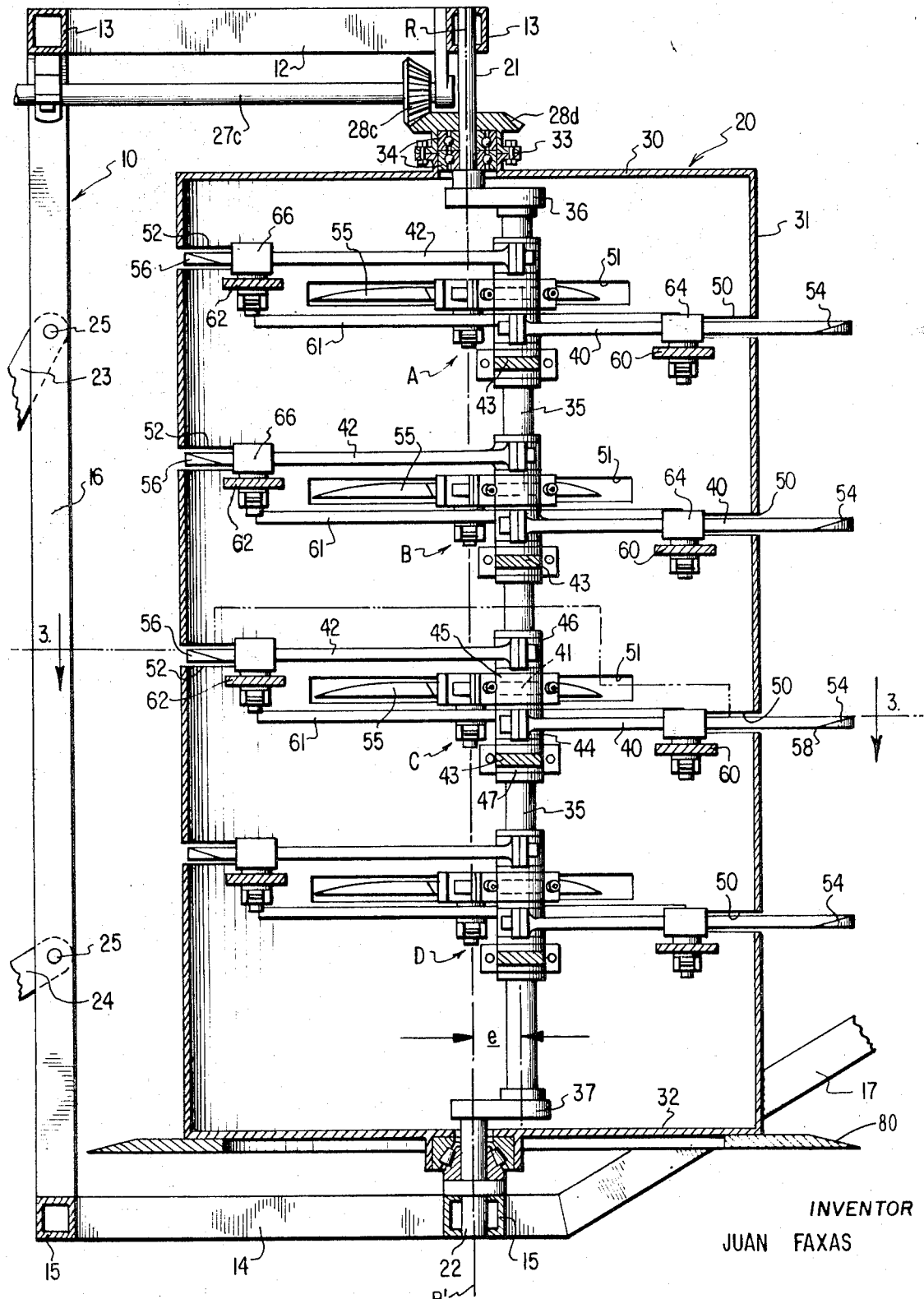
FIG. 2 is an enlarged sectional elevation view showing the drum member and rotating blade means and the manner of their cooperative assembly.
Figure 3:
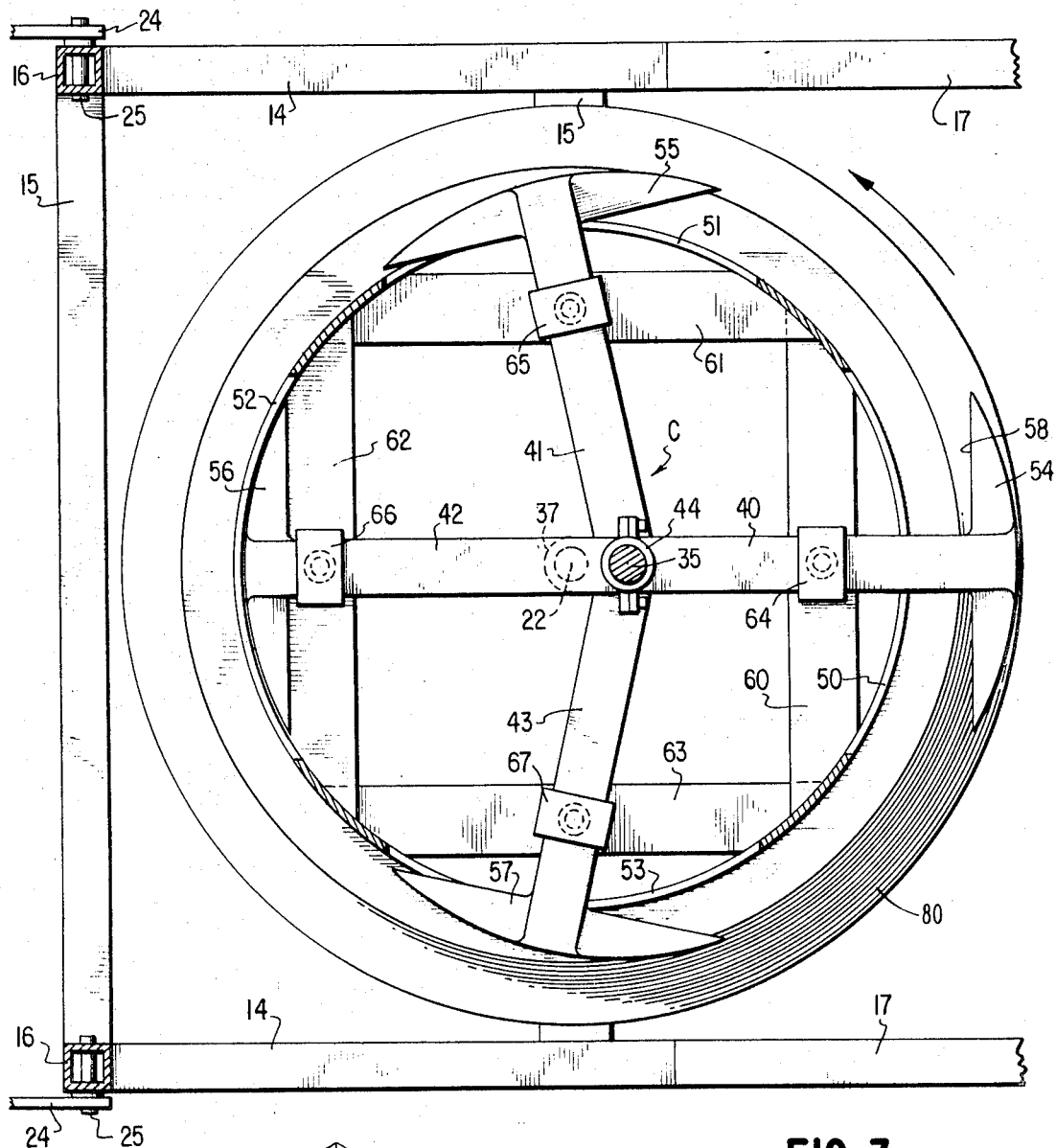
FIG. 3 is a sectional plan view taken along line 3—3 of FIG. 2.

With reference first to FIGS. 1, 2 and 3, there is indicated a movable support or carriage member 10 which is propelled by a tractor or "Cat" 11 in the direction denoted by large arrow D. Support member 10 is of a rigid frame-like box construction and comprises a pair of upper laterally spaced apart struts 12 connected by transverse struts 13, a pair of lower laterally spaced apart struts 14 connected by transverse struts 15, the resulting upper and lower rectangular frames being connected by rearwardly positioned vertical struts 16. Struts 14 are provided at their forward end with angularly projecting fork-like struts 17 through which passes a forward axle 18. Wheels 19 are rotatably mounted on the axle 18.

Again, in FIG. 1, a rotary cylindrical-form drum member 20 is rotatably mounted on support member 10 by means of upper axle 21 and lower axle 22. Axles 21, 22 are, in this embodiment fixedly attached to transverse struts 13 and 15, respectively, axles 21 and 22 comprising part of the mounting means for the hereinafter described shaft member. The drum member 20 is provided with a plurality of circumferential slots 50 cut through the drum wall. In this embodiment, there are 16 such slots which are regularly staggered and spaced both circumferentially and axially with respect to the drum surface. Also visible in FIG. 1 are a number of sickle-like blades 54, each such blade being operatively associated with its respective circumferential slot. The details and structural interrelationship of the drum, slots and blades are more clearly shown in FIGS. 2 and 3, to be later described.

The drum-support member assembly is operatively coupled to tractor 11 by two laterally spaced apart pairs of pushrods 23, 24 each pair of pushrods forming an "A-frame" member on either side of tractor 11. The "A-frames" are pivotally connected at their forward ends to vertical struts 16 by pins 25 and are pivotally connected at their rearward ends to tractor 11 by common pins 26 connecting with and centered on the rear axle of the tractor.

In this embodiment, the drum member 20 is positively driven by a rotary drive means comprising a train of universally-jointed drive shafts 27a, 27b and 27c and bevel gears 28a, 28b, 28c and 28d. Drive shaft 27a is operatively connected to a conventional power takeoff means 29 of tractor 11. Bevel pinion 28d is fixedly attached to the drum 20 and is journaled to upper axle 21.

With further reference to FIG. 1, the axis of rotation of drum 20, denoted as line R–R', is shown as being substantially inclined with respect to the vertical axis Y, said axis of rotation extending upwardly and forwardly with respect to the direction of horizontal movement D. The preferred ranges of the inclination angle $\theta$ and the purpose thereof will be amplified hereinbelow.

Turning now to FIGS. 2 and 3, there is shown in FIG. 2 a cutaway elevation view of the drum 20 having a top closure member 30, a cylindrical wall portion 31, and a bottom closure member 32. Bevel pinion 28d is fixedly attached to closure 30 by a bolted coupling 33 which retains packing 34. Positioned within the drum is a longitudinal shaft member 35 which extends parallel to the drum axis of rotation R–R' but is radially and forwardly offset therefrom a distance $e$. Shaft 33 is supported by and non-rotatably secured to axles 21, 22 by way of upper and lower support bars 36 and 37. A cluster or subassembly A of rotating-reciprocating blade means is journaled to the upper portion of shaft 35. Identical clusters B, C, D are also journaled thereto at axially spaced loci along the shaft. For the sake of brevity, only subassembly C will be described in detail, it being understood that units A, B, and D are of like structure.

The cluster C comprises four radial arm members 40, 41, 42, 43. Each of the arm members is connected at its inner end portion to the shaft 35 by journal fittings 44, 45, 46 and 47 which are constructed and arranged to permit free rotation of the arm members about shaft 35 in a plane of revolution which is perpendicular to shaft 35 and also to axis R–R', but said journal fittings precluding axial and radial displacement or slippage of the arm members relative to the shaft 35. The arm members of cluster C are, in this embodiment, equally spaced 90° apart relative to their plane of revolution. For each arm member and at a locus radially opposite therefrom, there is formed in drum wall 31 a corresponding circumferentially elongated slot. These are here denoted as slots 50, 51, 52 and 53 which are opposite arm members 40, 41, 42 and 43, respectively. The arm members extend radially outwardly from shaft 35 in alignment with their respective slots. There is attached to the outer end portion of each arm member a sickle-like blade member, here denoted as blades 54, 55 56 and 57 which are mounted on arm members 40, 41, 42 and 43, respectively. The inner edge of each blade, indicated by numeral 58 for blade 54 (FIG. 3), is sharpened to provide and to define a cane cutting edge. Its mode of cooperation with the drum surface and the slots will soon become evident.

There is further disposed within the drum 20 a series of four segmental struts 60, 61, 62 and 63 which are fixedly attached to the interior surface of the drum, as by welding. The segmental struts are axially staggered and are positioned directly below and extend transversely beneath the respective arm members 40, 41, 42 and 43. Operatively associated with each arm member is a torque-imparting bearing member, denoted as bearing members 64, 65, 66 and 67, which are pivotally connected to segmental struts 60, 61, 62 and 63, respectively. Each bearing member slidably engages its respective arm member at a locus spaced outwardly from the shaft 35, and serves to impart motion to the arm member as well as to furnish lateral support therefor. Each of the blade clusters A, B and D similarly has its own array of segmental struts and torque-imparting bearing members.

Figure 4:
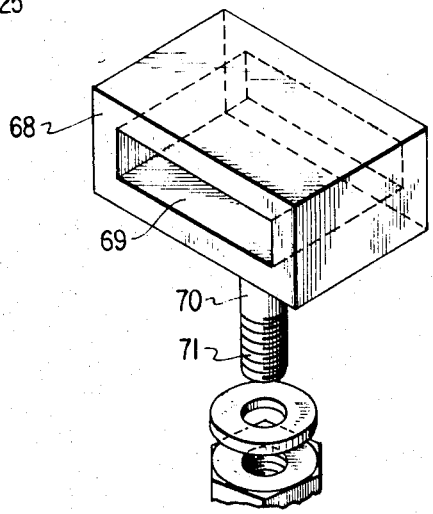
FIG. 4 is an enlarged perspective view of one appropriate form of torque-imparting bearing member as utilized in the structure of FIGS. 2 and 3.

A suitable form of torque-imparting bearing member is shown in FIG. 4. It comprises a block 68 having a bore 69 which is sized and shaped to accommodate, with relatively close clearance, the radial arm member which extends therethrough. The lower portion of the block is provided with a downwardly projecting pin 70 having a threaded end portion 71. The bearing member is secured to its corresponding strut by a locknut 72 in a manner which permits free rotation of the bearing member about pin 70.

The principal apparatus elements of the invention having been described, its manner of operation will now be apparent. As the drum 20 is rotated by pinion gears 28c and 28d, the torque-imparting bearing members 64, 65, 66 and 67, being carried by the drum, exert a turning moment upon the radial arms 40, 41, 42 and 43, thereby causing the radial arms to rotate synchronously with the drum. Because of the eccentricity $e$ obtaining between axis R–R' and shaft 35, the arm members will reciprocate relative to the torque-imparting bearing members, and the bearing members themselves will be called upon to oscillate back and forth over a limited angular displacement. Stated conversely, each torque-imparting bearing member slidably engages its respective arm member at and along an oscillating locus with respect to the shaft 35, the inner and outer limits of the oscillating locus being spaced outwardly from the shaft member. The arm members therefore rotate in a plane of revolution which is perpendicular to the axis of rotation of the drum 20. Also by reason of the eccentricity $e$, each of the radial arm members will advance out of its respective circumferential slot and then withdraw back into the drum during one full revolution of the drum. With particular reference to FIG. 3, the radial arm 40 is shown as being fully extended and projecting through the slot 50 and, at this point in time, its blade 54 is ready to engage, grip and cut a sugar cane stalk. The slot 50 is here perigeal relative to eccentric shaft 35, e.g., the midpoint of slot 50 has made its closest approach to the shaft. At its perigee, the cutting edge 58 of blade 54 is spaced outwardly a predetermined distance beyond the exterior surface 31 of drum 20, sufficient to engage and to grip the stalk of the cane between cutting edge and drum surface. The exact clearance will, of course, depend on the nature of the plant being harvested, but, by way of example, the clearance will be about 2½ inches for a sugar cane of 2" O.D. Now, as the drum is further turned in the counterclockwise direction, the blade 54 will begin to cut through the stalk while holding it ever more tightly to the spinning drum surface. At a slightly later point in time, the stalk will be cut loose and will by that time have acquired sufficient tangential velocity such that it will be thrown laterally (upwardly in FIG. 3) a considerable distance, at least several feet, away from the drum. Again, in FIG. 3, radial arm 41 and blade 55 are beginning to withdraw back through slot 51. Slot 52 is shown as being apogeal relative to shaft 35, e.g., the midpoint of slot 52 is at its maximum distance from shaft 35, and the radial arm 42 and its associated blade 56 are fully withdrawn into the drum. Radial arm 43 and its associated blade 57 are beginning to move out of slot 53. It will be apparent from this discussion that the length and thickness of the sickle blades will be proportioned in relation to the length and width of the circumferential slots so that each blade will freely pass into and out of its respective slot as the slot is rotated toward and through its apogeal position relative to the shaft member.

The degree of eccentricity $e$ and the length of the radial arm members may be varied over substantial limits depending on the type of crop being harvested. It will be evident that as $e$ is increased and the arm radius is decreased, the sickle blades will withdraw more quickly into the drum, thereby increasing the speed of cut and decreasing the contact time of stalk with drum surface. This will have the effect of throwing the cane in a more forward direction, that is, its horizontal velocity component will more nearly approach a line perpendicular to the direction of harvester travel. The eccentricity should not be so great, however, that the cane is completely cut before it can be accelerated to breakaway velocity. On the other hand, as $e$ is decreased and the arm radius increased, the sickle blades will withdraw more slowly into the drum, thereby decreasing the speed of cut and increasing the contact time of stalk with drum surface. This will have the opposite effect of throwing the cane in a more rearward direction, that is, its horizontal velocity component will more nearly approach a line parallel, but reversely directed, to the direction of harvester travel. Obviously, the eccentricity should not be reduced to zero nor should it be so small that the cane is insufficiently cut to break free of the drum. With these considerations in mind, the length of the arm member and the eccentricity $e$ will be correlated such that the cutting edge comes into tangential alignment with the exterior circumferential edges of its respective circumferential slot when the angular displacement of the slot is advanced to an angle within the range of from about 20° to about 90° beyond its perigee.

It is within the scope of my invention that the axis of revolution R–R' of drum member 20 can be vertical with respect to the ground, in which event the resulting cut and thrown cane will have very little, if any, vertical velocity component. In a distinctly preferred embodiment, however, axis R–R' is substantially inclined to the horizontal and extends upwardly and forwardly with respect to the harvester direction of travel. Still more preferably, axis R–R' will lie in a vertical plane which is substantially parallel to the direction of horizontal movement of the harvesting machine. When the axis of revolution of the drum member is thus inclined, the cane pieces will have both horizontal and vertical velocity components, whereby such pieces will follow a parabolic trajectory and thus will be impelled a greater distance as well as remaining aloft for a longer period of time. This in turn will enhance the degree of defoliation by virtue of the fact that, the leaves or straw and the stalk being cut all at one time and the leaves being less dense and experiencing more friction with the air than does the stalk, the leaves or straw will not fly as far as the cane stalks and will instead fall to the ground short of the truck bed or other receptacle into which the cut cane pieces are thrown. With reference to FIG. 1, the inclination angle $\theta$ may therefore range from 0° to about 50°, more preferably from about 5° to about 45°, and still more preferably from about 8° to about 30°. Maximum trajectory will be realized at an angle slightly less than 45°; however, if the inclination is too great, the cane may be mowed down or otherwise not uniformly cut. Again, the angle $\theta$ will be adjusted to suit the particular crop in question; for most species of sugar cane, an angle $\theta$ of from about 10° to about 25° will be optimum. The inclination angle can be easily field-adjusted by varying the lengths of pushrods 23 and 24.

The drum member 20 is preferably provided with a lowermost circular cutting blade 80 (FIGS. 1, 2) attached to the lower end of the drum for cutting the stalk close to the ground and to assure a desired uniform stubble height. Blade 80 will be in substantial vertical alignment with the sickle blades when the latter are perigeal so as to effect a simultaneous ground cut. Alternatively, the blade 80 may be extended slightly forwardly of the sickle blades so that the entire length of cane will be severed free of the ground just before being gripped by the sickles. This will minimize tearing of the cane stalk.

The dimensions of the drum member will depend on the nature of the plants being harvested. In the case of sugar cane, having a height of about 7 to about 15 feet, a drum length of about 6 to about 12 feet will be appropriate. A drum which is 8 feet long and 5 feet in diameter, having radial arms of 3 foot radius, is suitable for most sugar cane harvesting operations.

The angular velocity of the drum will likewise depend largely on the type of plant involved. All other factors being equal, the required angular velocity is directly proportional to the linear speed of the harvester and inversely proportional to the drum diameter. The distance reached by the cut pieces of cane is proportional to the diameter and angular velocity of the drum and to the sine of the inclination angle. Subject to net available horse-power and the limits of permissible centrifugal stress, a five foot diameter drum may be rotated at a speed of from about 20 to about 400 r.p.m.

A typical sugar cane harvesting operation employing my invention is illustrated in FIG. 1. The cane is severed from the ground by circular blade 80 and is gripped at four vertically spaced points by sickles 54. When the blades withdraw into the drum, the stalk is cut into five pieces which are thrown laterally to the bed of a truck (not shown) that is moving parallel and adjacent to the harvester. Moving at a speed of two m.p.h., a single operator using a single rotary drum will be able to clear about 10 acres of sugar cane in a 10-hour day to yield from 200 to 450 tons of cut and defoliated cane ready for transport to the sugar mill. The cane is substantially free of dirt and leaves and is quite clean enough to be processed at the sugar factory without further cleaning. It will be seen, therefore, that my invention offers substantial operating advantages, in that it combines into a single unitary operation the heretofore separately effected steps of severing, defoliating, subdividing and loading the cane.

Numerous other embodiments and variations of the basic invention described hereinabove will suggest themselves to the routineer. To highlight but a few such variants, all of which are encompassed by the appended claims except as otherwise specifically excluded, I point to the following:

(a) Respecting the support or carriage means 10, it may have a configuration other than the depicted box-like construction. Also, instead of an open type of construction, it may be of other arrangement. The forward or working face will, of course, be left substantially open to afford free access of drum and blades to the crop;

(b) Respecting the harvester propulsion means, specifically illustrated by a tractor, the same may be a truck or other equivalent ground vehicle;

(c) Regarding the means for effecting synchronous rotation of drum and blades, it will be immediately evident to those skilled in the art that the rotary drive means may be constructed and arranged to drive the shaft member;

(d) Although I have specifically disclosed a single drum-blade assembly, it will be appreciated by those skilled in the art that my invention is particularly well adapted to a multiple ganged arrangement, such as is shown in Benjamin, Pat. No. 1,782,560, granted Nov. 25, 1930.

I claim as my invention:

1. Cane harvesting apparatus comprising in combination:
    (1) a support member adapted to be operatively coupled with a tractor or similar ground vehicle whereby said support member can be moved over the ground;
    (2) a rotary drum member rotatably mounted on and carried by said support member, the axis of rotation of said drum member making a predetermined angle with the verticle which ranges from 0° to substantially inclined with respect to the vertical and, when inclined, said axis of rotation extending upwardly and forwardly with respect to the direction of horizontal movement of said support member; and said drum member being provided with at least one circumferential slot in the drum wall at a locus intermediate the top and bottom of the drum;
    (3) a shaft member positioned within said drum member and extending parallel to said axis of rotation but forwardly offset therefrom whereby the drum member will rotate eccentrically with respect to the shaft member;
    (4) means connecting said shaft member with said support member;
    (5) at least one radial arm member connecting at its inner end portion with said shaft member at a locus opposite said circumferential slot, and said arm member thence extending radially outwardly from said shaft member toward said slot, said arm member projecting through said slot and beyond the drum wall when the slot is perigeal relative to said shaft member;
    (6) a torque-imparting bearing member carried by said drum member which slideably engages said arm member at an oscillating locus with respect to said shaft member, the inner and outer limits of said oscillating locus being spaced outwardly from said shaft member, whereby said arm member is free to rotate in a plane of revolution which is perpendicular to the axis of rotation of said drum member, and whereby a rotary driving force applied to said drum will effect a synchronous rotation of said arm member and vice versa;
    (7) a sickle-like blade attached to the outer end portion of said radial arm member, the inner edge of said blade defining a cane cutting edge which is spaced outwardly a predetermined distance beyond the exterior surface of the drum, sufficient to engage and grip the stalk of the cane between cutting edge and drum surface, when said slot is perigeal as defined in (5); and the length of said arm member and the degree of eccentricity as defined in (3) being correlated such that said cutting edge is withdrawn into tangential alignment with the exterior edges of said circumferential slot when the angular displacement of the slot is advanced appreciably beyond perigeal; and the length and thickness of said blade being proportioned so that the blade will freely pass into and out of said slot as the latter is rotated toward and through its apogeal position relative to said shaft member; and (8) rotary drive means operatively connecting with one of said drum and shaft members.

2. The apparatus of claim 1 wherein said radial arm member is journaled to said shaft member and said rotary drive means connects with said drum member, the shaft member being nonrotating.

3. The apparatus of claim 2 wherein the axis of rotation of said drum member makes an angle with the vertical within the range of about 5° to about 45° and lies in a vertical plane which is substantially parallel to the direction of horizontal movement of said support member.

4. The apparatus of claim 2 wherein there is journaled to said shaft member at least a pair of opposing sickle-like blades spaced 180° apart relative to their plane of revolution, each of said blades having its own circumferential slot, radial arm member and torque-imparting bearing member.

5. The apparatus of claim 4 wherein there is journaled to said shaft member a plurality of such opposing pairs of blades, said pairs being axially spaced along the shaft member.

6. The apparatus of claim 2 wherein there is journaled to said shaft member a cluster of four sickle-like blades spaced 90° apart relative to their plane of revolution, each of said blades having its own circumferential slot, radial arm member and torque-imparting bearing member.

7. The apparatus of claim 6 wherein there is journaled to said shaft member a plurality of clusters of blades, said clusters being axially spaced along the shaft member.

8. The apparatus of claim 1 wherein a laterally extending circular cutting blade is attached to the lower end portion of said drum member for cutting the cane stalk close to the ground.

9. The apparatus of claim 1 wherein said rotary drive means comprises a drive shaft means which in turn is operatively connected to a power take-off means on said ground vehicle.

References Cited
UNITED STATES PATENTS

| | | | |
|---|---|---|---|
| 1,782,560 | 11/1930 | Benjamin | 56—60 |
| 1,945,733 | 2/1934 | Court | 56—60 |
| 2,269,530 | 1/1942 | Grant | 56—60 |
| 2,644,292 | 7/1953 | Oberholtz et al. | 56—364 |
| 2,803,505 | 8/1957 | Oberholtz | 56—364 |

ANTONIO F. GUIDA, Primary Examiner

U.S. Cl. X.R.

56—60